April 14, 1970    A. B. ANDERSEN    3,506,250
ROTARY KILN AND METHOD FOR MANUFACTURE OF WHITE CEMENT
Filed Sept. 23, 1968    2 Sheets-Sheet 1

INVENTOR
Axel Brix Andersen
ATTORNEYS

April 14, 1970 A. B. ANDERSEN 3,506,250
ROTARY KILN AND METHOD FOR MANUFACTURE OF WHITE CEMENT
Filed Sept. 23, 1968 2 Sheets-Sheet 2

INVENTOR
Axel Brix Andersen
ATTORNEYS

United States Patent Office 3,506,250
Patented Apr. 14, 1970

3,506,250
ROTARY KILN AND METHOD FOR MANUFACTURE OF WHITE CEMENT
Axel Brix Andersen, Larchmont, N.Y., assignor to F. L. Smidth & Co., New York, N.Y., a corporation of Delaware
Continuation-in-part of application Ser. No. 638,232, May 15, 1967. This application Sept. 23, 1968, Ser. No. 761,664.
Int. Cl. F27b 7/00; C04b 7/50
U.S. Cl. 263—32                              7 Claims

ABSTRACT OF THE DISCLOSURE

In the manufacture of white cement, clinker material is treated with a reducing agent in a rotary kiln and thereafter is fed into an indirect cooling zone for indirect heat exchange relationship with cooling air to reduce the temperature of the material to below that at which it will oxidize in contact with the cooling air, and then into the direct cooling zone for direct contact with the cooling air; the cooling air is heated in the cooling process and is used as preheated combustion air in the kiln.

CROSS-REFERENCE TO RELATED APPLICATION

This application is a continuation-in-part of my application Ser. No. 638,232 filed May 15, 1967, now abandoned.

BRIEF SUMMARY OF THE INVENTION

This invention relates to a method and apparatus for the treatment of burned clinker material in the manufacture of white cement.

One process for the manufacture of white cement is described in U.S. Patent No. 3,074,705 and involves spraying a reducing agent on a kiln charge at the lower end of the burning zone of a rotary kiln, and immediately below that spraying water on the charge to effect a rapid cooling of the clinker to temperatures low enough to prevent re-oxidation of the iron, chrome and manganese compounds.

While this conventional process can produce cement of high whiteness, it has certain disadvantages. For example, due to cooling of the cement clinker by means of water spray, the latent heat in the clinker cannot be recovered, and the water spray introduces a high quantity of steam into the kiln which has a deteriorating effect on the temperature gradient in the kiln, particularly in the burning zone. The result of these two factors is that the maximum output of a white cement kiln is only about 66% of the output of an equivalent gray portland cement kiln and the amount of heat required to burn a barrel of clinker is 50% higher for the production of white cement than for the production of standard gray cement. I have found that the manufacture of white cement can be improved by indirect cooling of the clinker in a neutral or reducing atmosphere through the critical temperature interval where re-oxidation takes place followed by conventional direct cooling to the desired discharge temperature of the cooled material.

Broadly stated the invention is in the manufacture of white cement and relates to a method of treating burned clinker material suitable for the production of white cement traveling through a rotary kiln from the burning zone in a stream having an upper surface inclined to the horizontal. The method comprises reducing the burned material by directing a spray of reducing agent upon an area of the inclined surface of the moving burned material, introducing the material into an indirect cooling zone having an inert or reducing atmosphere and cooling the material by indirect heat exchange relationship with cooling air to a temperature below that at which re-oxidation would take place if in direct contact with the cooling air, removing the material from the indirect cooling zone, and introducing the material to a direct cooling zone for direct contact with the cooling air for further cooling of the material, and feeding the cooling air through the direct and indirect cooling zones where it is preheated, and fed into the discharge end of the kiln as preheated, combustion air.

The invention also provides an improvement in apparatus for treating burned cement clinker material in the manufacture of white cement of the type basically comprising a rotary kiln with its axis mounted at a low angle of incline to the horizontal through which material passes in a stream, a fuel pipe leading into the discharge end of the kiln and a reducing agent pipe also leading into the discharge end of the kiln. The improvements include cooling tubes mounted on the kiln and extending lengthwise therewith and rotatable with the kiln and outlets in the discharge end of the kiln leading into an inlet end of the cooling tubes. A first indirect cooling chamber is provided in the inlet end of each cooling tube with tubes provided therein through which cooling air is conveyed for indirect heat exchange relationship between the cooling air and the material. A direct cooling chamber is also provided in each tube and is separated longitudinally from the indirect cooling chamber. Means are provided in the apparatus for transferring material from the first chamber to the second chamber as the kiln rotates, and other means are provided for sucking the cooling air through the direct and indirect cooling chambers. Ducts are provided for receiving heated cooling air from the tubes of the indirect cooling chamber and introducing the heated cooling air into the discharge end of the rotary kiln as preheated combustion air.

BRIEF DESCRIPTION OF THE PREFERRED EMBODIMENTS

Figure 1:
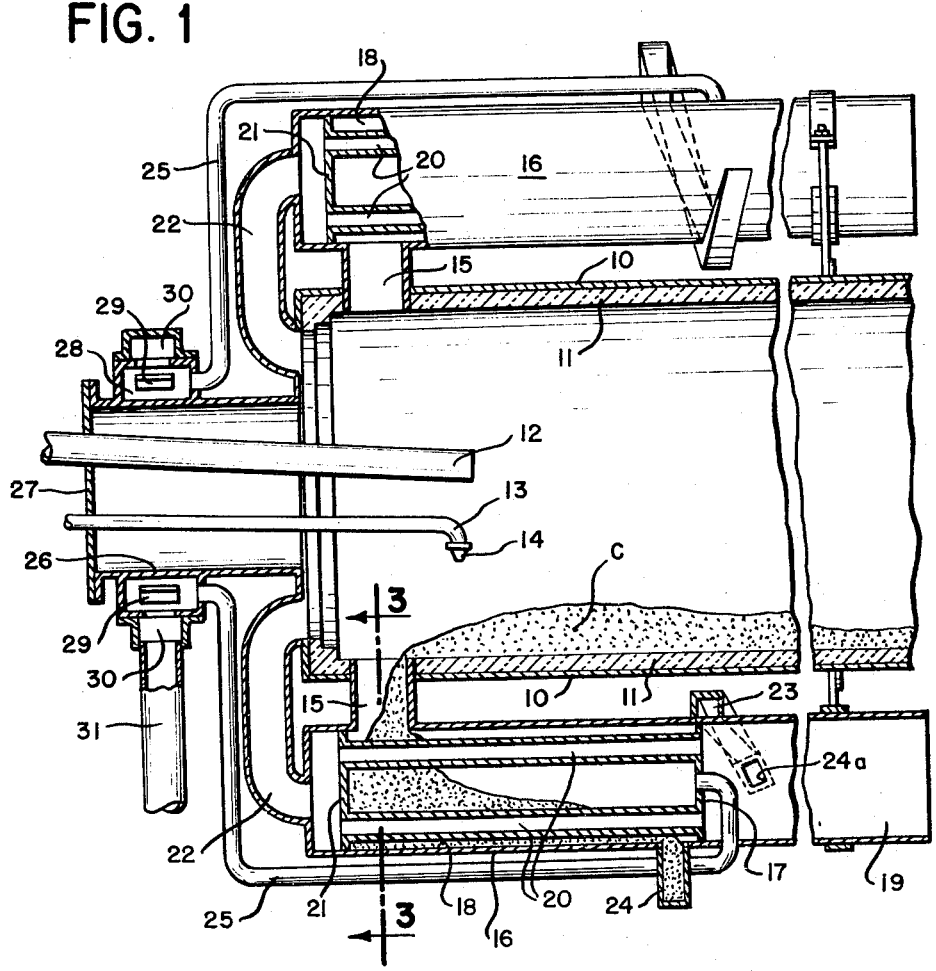
FIG. 1 is a vertical longitudinal sectional view of the discharge end of the kiln and apparatus of the invention.
Figure 2:
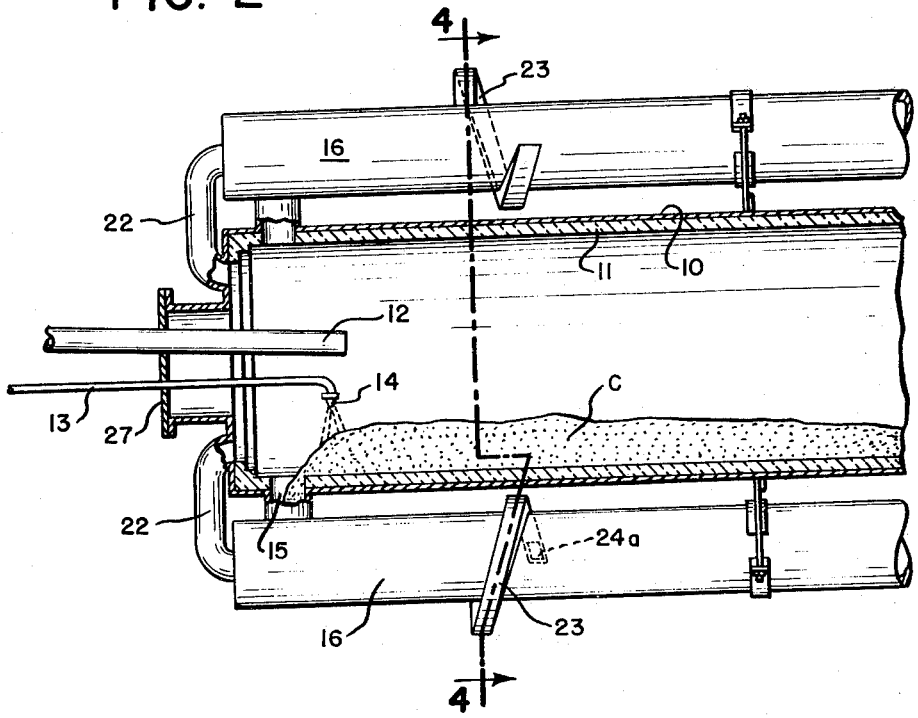
FIG. 2 is partly in longitudinal elevation, with the kiln in section, of one form of the new apparatus.

The kiln shown in FIGS. 1 and 2 is of conventional construction and includes a shell 10 with a lining 11 and is mounted with its axis at a low angle of incline to the horizontal and rotatable about its axis so that material passes in a steady stream from its inlet end to the discharge end. A burner pipe 12 extends a short distance into the kiln and terminates a short distance from the discharge end of the kiln and conducts the primary fuel-air mixture which is burned in the kiln. Material burned to the form of clinker C is progressively conveyed in a stream to the discharge end of the kiln.

Figure 4:
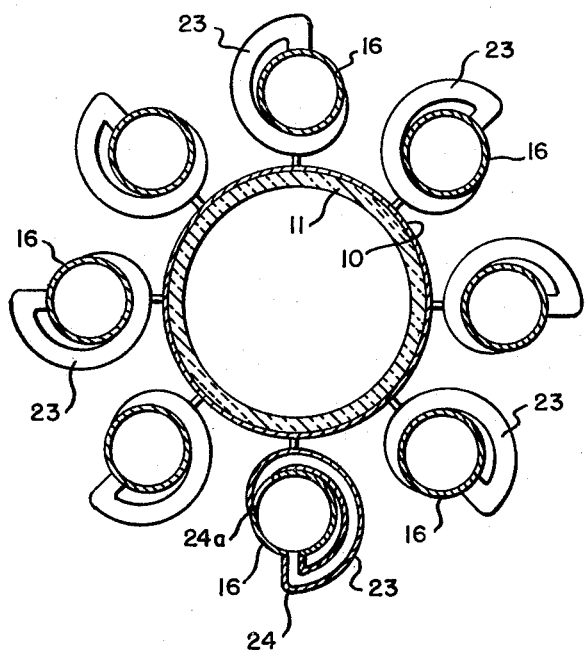
FIG. 4 is a section taken substantially along the line 4—4 of FIG. 2.

In the manufacture of white cement, small amounts of iron, maganese and chrome are likely to be present in the raw materials and the coloring action of these ingredients of the mix can be prevented by subjecting the hot clinker to a reducing action followed by a cooling action. For this purpose the kiln is provided with a pipe 13 which extends just below the fuel pipe 12 into the discharge end of the kiln and by one or more nozzles 14 sprays a reducing agent, in the form of a spray, on the moving clinker stream at the discharge end of the kiln. Provided at the endmost portion of the discharge end of the kiln are a series of peripherally spaced outlets 15, each of which extend radially from the kiln a short distance and connect with a cooling tube 16. The cooling tubes, which are preferably made of a heat resistant steel, are mounted on the kiln in a planetary arrangement and are rotatable with the kiln. As shown in FIG. 4, for example, eight cooling tubes are provided peripherally spaced about the kiln and extend rearwardly from the discharge end of the kiln toward the inlet end of the kiln.

Figure 3:
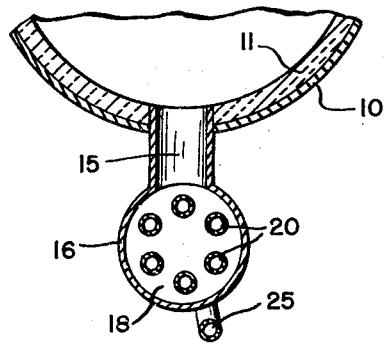
FIG. 3 is a section taken substantially along the line 3—3 of FIG. 1.

As shown in FIG. 1, each of the cooling tubes 16 is divided by an intermediate partition 17 into an indirect cooling chamber 18 and a direct cooling chamber 19. The indirect cooling chamber is located along the end portion of the cooling tube adjacent the discharge end of the rotary kiln with an outlet 15 opening therein to feed clinker from the rotary kiln. As shown in FIG. 3, there is provided in the indirect cooling chamber a bundle of laterally spaced tubes 20 which are spaced apart sufficiently to allow the clinker to pass therebetween in heat exchange relationship. One end of the tube bundle 20 is supported in the intermediate partition 17 and the opposite end is supported in an end partition 21 positioned just beyond the outlet 15. The tubes 20 are open to air flowing from the direction cooling chamber 19 and empty beyond partition 21 into a curved duct 22 which is curved radially inward and is connected to and opens into the discharge end of the rotary kiln. The length between partition 21 and intermediate partition 17 is sufficient to permit cooling of the clinker to below the temperature at which it will oxidize upon direct contact with the cooling air. Provided at the intermediate partition 17 is a spiral device 23 which has its inlet end 24 open into the indirect cooling chamber 18 and its outlet end 24a open into the direct cooling chamber 19. This conventional spiral device 23 becomes filled at its inlet end 24 with clinker and upon rotation of the cooling tube 16 with the kiln it is spirally conveyed from the indirect cooling chamber 18 to the direct cooling chamber 19 by-passing partition 17. The material in the spiral device provides its own seal and prevents cooling air from being sucked into the indirect cooling chamber from the direct cooling chamber. To insure that no re-oxidation takes place in the indirect cooling zone, an inert or reducing gas such as nitrogen or coke furnace smoke is continuously introduced into indirect cooling chamber 18 through supply duct 25 which is provided for each of the cooling tubes. As can be seen in FIG. 1, one end of each pipe 25 opens centrally into the indirect cooling chamber 18 through the partition 17 and from there it extends along the cooling tube and eventually, after a 90° bend, it passes radially towards the axis of the kiln until it meets a cylindrical sleeve 26 fixed to the end of the kiln so as to rotate therewith and encircle a space through which pipes 12 and 13 pass. At its other end the sleeve 26 is closed by a stationary cover 27 through openings in which the said two pipes pass. A seal (not shown) is provided between the rotating sleeve and its stationary cover.

The said sleeve is surrounded by an annular space 28 rotating with the kiln and bounded by two annular lateral walls and an outer cylindrical wall. All the pipes 25 communicate with the space 28 through openings in the lateral wall next to the kiln. The cylindrical wall is provided with uniformly distributed openings 29 through which the space 28 communicates with another space 30, which stationarily surounds the space 28 and, like this, is bounded by two annular lateral walls and an outer cylindrical wall. Seals (not shown) are provided between the stationary annular lateral walls of the space 30 and the rotating outer cylindrical wall of the space 28. The space 30 is by means of a pipe 31 connected to some source (not shown) of an inert or reducing gas. This source may be a gas cylinder containing nitrogen or it may be a gas discharge pipe from a coke furnace, the exit gas of which has been relieved of the major part of its oxygen content in nourishing the burning of the coke.

In operation the gas in question passes continuously under pressure from the gas source through pipe 31 into the space 30 and from there, through the openings 29, into the space 28, which acts as a distributing chamber uniformly distributing the gas received to the cooling tubes 16 through the pipes 25. The indirect cooling chamber 18 in each of the cooling tubes will consequently always be filled with an inert or reducing gas which prevents atmospheric air from reaching the said chambers through ducts 22 and outlets 15. On the contrary, the gas fed to the indirect cooling chambers leaves these again at the other end through the said outlets 15 and reaches the interior of the kiln, where it will do no harm. In this way any risk of the clinker being re-oxidized in the indirect cooling chambers is wholly eliminated.

The material in the direct cooling chamber then flows in a direction away from the indirect cooling chamber countercurrent to a cooling air being fed to the indirect cooling chamber and the material is progressively cooled until it reaches the end of the cooling tube 16 where it is discharged.

In operation, the moving stream of cement clinker C is sprayed with a reducing agent (e.g., oil) while the temperature of the clinker is at least about 2100° F. (1150° C.), to the extent that at least a neutral and if desired a reducing atmosphere is created at the discharged end of the kiln and in the indirect cooling chamber. The clinker immediately drops through the outlets 15 into the cooling tubes 16 as the kiln is rotated. In each cooling tube the clinker falls into the indirect cooling chamber 18 in which is maintained an inert or reducing atmosphere where it is tumbled around the tube bundle and thereby placed in heat exchange relationship with the cooling air sweeping through the tubes. The length of the indirect cooling chamber is sufficient to cause the temperature of the clinker to drop to about 1200 to 1500° F. (650 to 800° C.) before it is transferred by means of the spiral by-pass device 23 into the direct cooling chamber 19. Once in the direct cooling chamber, the material travels countercurrent to the cooling air sweeping therethrough from the end of the cooling tube and is further cooled by direct contact with the air. Then when the cooled material reaches the end of the cooling tube it is discharged and collected for further operations. It is also proposed that the tube bundles 20 in the indirect cooling chamber can be directly connected to an atmospheric air source so as to provide more efficient cooling in the indirect cooling chamber.

The temperature at which the clinker enters the spiral device is below that at which re-oxidation would take place upon direct contact with the cooling air. The cooling air which is sucked in through the direct cooling chambers, passes through the tube bundles and enters the kiln by means of the curved ducts 22 is being preheated by the direct and indirect contact with the clinker. Thereby the latent heat of the clinker is being recovered resulting in increased fuel efficiency for the entire operation.

I claim:

1. In the manufacture of white cement a method of treating burned clinker material suitable for the production of white cement after traveling through a rotary kiln from the burning zone which comprises reducing the burned material by directing a spray of reducing agent upon an area of moving burned material, thereafter introducing the material into an indirect cooling zone and cooling the material by indirect heat exchange relationship with cooling air to a temperature at which there will be no oxidation of the material, removing the material from the indirect cooling zone, and introducing the material to a direct cooling zone for direct contact with the cooling air for further cooling of the material, discharging the cooled material, and feeding the cooling air through the direct and indirect cooling zones where it is preheated and then introducing the preheated air into the discharge end of the kiln as preheated combustion air.

2. A method according to claim 1, wherein the cooling of the material in the indirect cooling zone is effected in an inert or reducing atmosphere which is maintained by continuously introducing an inert or reducing gas into said zone.

3. A method according to claim 1 wherein the temperature of the material fed into the indirect cooling zone is above about 2100° F. and the temperature of the material leaving the indirect cooling zone is below about 1500° F.

4. In the manufacture of white cement from burned clinker material in a rotary kiln having an axis inclined to the horizontal through which material passes in a stream, a fuel pipe leading into the discharge end of the kiln and a reducing agent pipe leading into the discharge end of the kiln, the improvement in combination therewith comprising cooling tubes mounted on the kiln and extending lengthwise therewith and rotatable with the kiln, outlets in said discharge end of the kiln leading into an inlet end of the cooling tubes, a counter current indirect cooling chamber in the inlet end of each cooling tube, said indirect cooling chamber having therein tubes extending axially parallel to the rotary kiln through which cooling air is conveyed for indirect heat exchange between the cooling air and the material, a direct cooling chamber separated longitudinally from the indirect cooling chamber in each cooling tube, means for transferring material from the indirect cooling chamber to the direct cooling chamber as the kiln rotates, means for feeding cooling air through the direct and indirect cooling chambers and duct means for receiving cooling air from the tubes of the indirect cooling chamber and introducing the heated cooling air into the discharge end of the rotary kiln as preheated combustion air.

5. A system according to claim 4 wherein the axially extending tubes within the indirect cooling chamber comprise clinker material carrying tubes which are closed to the direct cooling chamber but open to a duct means supplying an inert or reducing gas and air tubes open at one end to the direct cooling chamber and at the opposite end to a duct leading into the discharge end of the rotary kiln.

6. A system according to claim 5 wherein means are provided for feeding material from the indirect cooling chamber to the direct cooling chamber.

7. A system according to claim 6 wherein said means is a spiral duct through which the material flows, the kiln and tubes are rotated with the material in the spiral duct providing a barrier to cooling air flowing into the indirect cooling chamber in contact with the material therein.

References Cited
UNITED STATES PATENTS

| | | | |
|---|---|---|---|
| 3,074,705 | 1/1963 | Dano et al. | 263—33 |
| 3,279,775 | 10/1966 | Roubal | 263—32 |

FOREIGN PATENTS

| | | |
|---|---|---|
| 814,836 | 6/1959 | Great Britain. |

JOHN J. CAMBY, Primary Examiner

U.S. Cl. X.R.

263—53